United States Patent
Sugiura et al.

(10) Patent No.: US 6,839,191 B2
(45) Date of Patent: Jan. 4, 2005

(54) OPTICAL NEAR-FIELD GENERATING ELEMENT AND OPTICAL APPARATUS INCLUDING THE SAME

(75) Inventors: Satoshi Sugiura, Saitama (JP); Yuzo Yamakawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 95 days.

(21) Appl. No.: 10/209,975

(22) Filed: Aug. 2, 2002

(65) Prior Publication Data

US 2003/0128945 A1 Jul. 10, 2003

(30) Foreign Application Priority Data

Aug. 3, 2001 (JP) ..................................... 2001-236110

(51) Int. Cl.$^7$ ................................................ G02B 6/00
(52) U.S. Cl. ..................................... 359/738; 250/216
(58) Field of Search ............................. 359/738, 739; 250/216, 234–236, 227.11, 309

(56) References Cited

U.S. PATENT DOCUMENTS

| | | | |
|---|---|---|---|
| 5,689,480 A | | 11/1997 | Kino |
| 5,696,372 A | | 12/1997 | Grober et al. |
| 5,973,316 A | * | 10/1999 | Ebbesen et al. ............ 250/216 |
| 6,040,936 A | * | 3/2000 | Kim et al. .................. 359/245 |
| 6,052,238 A | * | 4/2000 | Ebbesen et al. ............ 359/738 |
| 6,201,226 B1 | * | 3/2001 | Shimada et al. ......... 250/201.3 |
| 6,285,020 B1 | * | 9/2001 | Kim et al. .................. 250/216 |
| 6,303,402 B1 | | 10/2001 | Hatano et al. |
| 6,541,755 B1 | * | 4/2003 | Fujita et al. ................ 250/216 |
| 6,574,257 B1 | * | 6/2003 | Thronton et al. ............. 372/46 |
| 2003/0015651 A1 | * | 1/2003 | Kiguchi et al. ............. 250/234 |
| 2003/0185135 A1 | * | 10/2003 | Fujikata et al. ........ 369/112.21 |

FOREIGN PATENT DOCUMENTS

| | | |
|---|---|---|
| EP | 1 026 674 A1 | 8/2000 |
| EP | 1 148 370 A2 | 10/2001 |

OTHER PUBLICATIONS

Japanese Abstract No. 2001013056, dated Jan. 19, 2001.
Milster T D et al; "Super–resolution by combination of a solid immersion lens and an aperture"; 10$^{th}$ International Symposium on Optical Memory 2000 (ISOM 2000), Hokkaido, Japan Sep. 5–8, 2000, vol. 40, No. 3B, pp. 1778–1782, XP002222849, Japanese Journal of Applied Physics, Part 1(Regular Papers, Short Notes & Review Papers), Mar. 2001, Japan Soc. Appl. Phys. Japan, ISSN: 0021–4922.
Young–Joo Kim et al.; "Parallel recording array head of nano–aperture flat–tip probes for high–density near–field optical data storage", 10$^{th}$ International Symposium on Optical Memory 2000 (ISOM 2000), Hokkaido, Japan, Sep. 5–8, 2000, vol. 40, No. 3B, pp. 1783–1789, XP002222850, Japanese Journal of Applied Physics, Part 1 (Regular Papers, Short Notes & Review Papers), Mar. 2001, Japan Soc. Appl. Phys, Japan, ISSN:0021–4922.
Pohl D W et al.; "Near–Field Optics: Light for the World of Nano–Scale Science" Thin Solid Films, Elsevier–Sequoia S.A. Lausanne, CH, vol. 264, No. 2, Aug. 15, 1995, pp. 250–254, XP000525715, ISSN: 0040–6090.

* cited by examiner

*Primary Examiner*—Georgia Epps
*Assistant Examiner*—Darryl J. Collins
(74) *Attorney, Agent, or Firm*—Sughrue Mion, PLLC

(57) ABSTRACT

An optical near-field generating element is provided with: a light shielding member, which is placed on an optical path of light emitted from a light source, for defining a micro opening having a diameter equal to or shorter than a wavelength of the light; and a dielectric film placed in close contact with the micro opening. Alternatively, an optical near-field generating element is provided with a light shielding member, which is placed on an optical path of lights emitted from a light source, for defining a micro opening having a diameter equal to or shorter than a wavelength of the light, the shielding member equipped with: a main portion for defining a basic shape of the micro opening; and a protrusion portion protruding from the main portion toward the center of the micro opening.

30 Claims, 8 Drawing Sheets

| | NO FILM | FILM THICKNESS 33nm | FILM THICKNESS 21nm | FILM THICKNESS 9nm |
|---|---|---|---|---|
| LIGHT TRANSMITTANCE (%) | 0.01 | 0.3 | 0.06 | 0.02 |
| AMPLIFICATION | 1 time | 30 times | 6 times | 2 times |

OPTICAL NEAR-FIELD GENERATING ELEMENT AND OPTICAL APPARATUS INCLUDING THE SAME

BACKGROUND OF THE INVENTION

1. Field of the Invention

The present invention relates to an optical near-field generating element, which is preferably used for an optical head or a probe array head of an optical memory, a fiber probe for a microscope, an exposing head in a fine machining apparatus containing an exposing apparatus and the like, and various optical apparatuses including them.

2. Description of the Related Art

The light emitted from an optical head used for an optical memory, such as a recordable optical disc and the like, needs to be basically fine focused in order to make a record density higher. For this reason, conventionally, instead of red laser light, blue laser light having a shorter wavelength is used, and a focus performance in a lens, such as a solid immersion lens and the like, is improved. Typically, since the light is diffracted, it is said that the treatment of a substance smaller than the wavelength of the light is substantially impossible in principle. The minimum dimension that can be treated depending on this light diffraction is referred to as a diffraction limit. In view of this diffraction limit, it is already difficult to make the record density dramatically higher in the optical memory. Similarly, in view of the diffraction limit, even in a case of an optical microscope, it is already difficult to improve a resolution in an optical system using a usual lens. In a case of an optically fine machining apparatus, an optical communication system, an optical device or various other optical apparatus, it is already difficult to attain a dramatically high performance. Thus, it is requested to develop a technique of substantially fine focusing light based on another principle without the reduction in the wavelength and the improvement of the lens performance.

Under such a request, a research has been advanced with regard to an optical microscope and an optical head of an optical memory using an optical near-field generating element that can be used as light equivalent to a very fine focused light. Already, it has been put to practical use with regard to an optical microscope of a type in which the optical near-field generating element is generated at the tip of a fiber probe.

Here, Optical Near-Field will be explained in brief. A hole having a diameter shorter than a wavelength of light is made on a light shielding film. The light is emitted to the hole from one side (input side) of the light shielding film. At this time, the light neither diffuses nor passes through the hole. However, a surface wave of the light is confined near the hole, and a thin layer of the light having spherical surface is formed near the hole on the other side (output side) of the light shielding film. This surface wave of the light is referred to as the optical near-field. For example, in a case of light having a wavelength of 400 nm, a surface wave, which is exponentially attenuated, collectively exists within a sphere having a radius of about 400 nm, for a hole having a diameter of 400 nm or less. Also, in a case of a diameter of 100 nm, the surface wave, which is exponentially attenuated, collectively exists within a sphere having a radius of about 100 nm. Such a surface wave is never outputted or propagated from the output side under that condition. However, under the condition that this optical near-field is generated, for example, if a surface of an optically recording medium as an optical memory or a surface of an inspection target sample of a microscope approaches until it comes in contact with a thin layer of lights constituting the surface wave serving as the optical near-field, namely, if it approaches to a situation within several hundred nm to several ten nm, the surface wave confined in this extremely small region is outputted from the output side of the hole towards the approaching surface. Thus, the optical near-field can be used as the light equivalent to the very fine focused light. Moreover, it is expected to be applied to a higher density recording, a higher resolution, a super fine machining process in a next generation of an optical apparatus.

However, if the optical near-field is generated, the strength of the light that can be used as the optical near-field on the output side is extremely low as compared with the strength or the amount of the incident light. For example, if the amount of the light that can be used as the optical near-field is converted into a transmission rate implying a transmission through the hole, it is only about several $\frac{1}{1000}\%$ to several $\frac{1}{100}\%$. Moreover, this transmission rate becomes further reduced as the optical near-field is focused smaller by making the hole smaller. Thus, as the optical near-field is focused smaller in order to make the density of the optical memory higher, the amount of the usable light is reduced. After all, this results in a problem that its practical usage is essentially difficult.

In particular, in a case of a service such as a microscope in which a speed is not important, the practical usage can be attained even if a weak optical near-field is ineffectively used. However, in a case of a service such as an optical memory requiring a writing speed and a reading speed, a service such as an optical communication system or an optical device requiring an operational speed, and a service such as a fine processing apparatus requiring a machining speed such as an exposing speed and the like, even if the light can be focused smaller, if its optical strength is extremely reduced, there is almost no utility worth on the practical usage. Hence, this problem is extremely severe on the actual usage.

SUMMARY OF THE INVENTION

The present invention is proposed in view of the above mentioned problems. It is therefore an object of the present invention to provide an optical near-field generating element that can increase strength of an optical near-field while making an existence region of the optical near-field smaller, and various optical apparatuses having such an optical near-field generating element.

The above object of the present invention can be achieved by a first optical near-field generating element provided with: a light shielding member, which is placed on an optical path of light emitted from a light source, for defining a micro opening having a diameter equal to or shorter than a wavelength of the light, and a dielectric film placed in close contact with the micro opening.

According to the first optical near-field generating element of the present invention, when light is emitted from the light source, an optical near-field is generated near the micro opening on the opposite side of where the light enters, because of the micro opening having the diameter equal to or shorter than the wavelength of the light, which is defined by the light shielding member placed on the optical path. Here, theoretically, it is necessary to confine the light inside the micro opening in order to increase the intensity of the optical near-field If the refractive index of the dielectric film is greater than that of the light incident side of the optical path, which is, for example, made of air or a light guiding member or the like such as an optical fiber, glass, and the like, it is possible to efficiently confine the light inside the micro opening. Consequently, it is possible to efficiently increase the intensity of the optical near-field. Then, practically, according to the first optical near-field generating element of the present invention, the dielectric film is placed in close contact with the micro opening, so that the intensity of this optical near-field increases according to the refractive index of the dielectric film as compared with the case of its absence, which has been confirmed by the present inventor. More concretely, as the refractive index of the dielectric film is higher, the intensity of the optical near-field becomes higher. For example, if this index is about 1.5 to 2.0, the intensity of the optical near-field increases to the order several times larger than that obtained in the case of the absence of the dielectric film in transmittance, which has been confirmed. If using the dielectric film having a higher refractive index, the intensity of the optical near-field drastically increases from several times to several dozen times larger than that obtained in the case of the absence of the dielectric film in transmittance, which has been also confirmed. As described above, by placing the dielectric film in close contact with the micro opening portion, while reducing in size the micro opening of the light shielding member, it is possible to generate the optical near-field with its presence region small and with its intensity increased by the dielectric film.

Incidentally, as for the light shielding member in the present invention, its light transmittance is equal to or less than about 50% and it shields light. The light shielding member described above is constructed by a metallic film or the like, for example. The dielectric film may be formed by deposition or the like.

In one aspect of the first optical near-field generating element of the present invention, the micro opening may have a diameter equal to or shorter than ½ of the wavelength of the light.

According to this aspect, the micro opening with a relatively small diameter, which is equal to or shorter than ½ of the wavelength of the light, can increase the intensity of the optical near-field with the dielectric film, while reducing the presence region of the optical near-field.

In another aspect of the first optical near-field generating element of the present invention, a refractive index of the dielectric film may be greater than that of the incident side of the optical path.

According to this aspect, since the refractive index of the dielectric film is greater than that of the optical path made of, for example, air or an optical fiber, glass, or the like, it is possible to efficiently confine the light inside the micro opening, which can efficiently increase the intensity of the optical near-field.

In another aspect of the first optical near-field generating element of the present invention, the dielectric film may be provided with a single layer.

According to this aspect, the close contact placement of the dielectric film constructed by the single layer can increase the intensity of the optical near-field with a relatively simple configuration.

Alternatively, in another aspect of the first optical near-field generating element of the present invention, said dielectric film may be provided with a plurality of layers.

According to this aspect, the dielectric film provided with a plurality of layers such as two or three layers or more can increase its refractive index relatively easily, and its close contact placement can efficiently increase the intensity of the optical near-field.

In another aspect of the first optical near-field generating element of the present invention, it may be provided with a metallic film having a light transmission characteristic and placed in close contact with the micro opening, instead of or in addition to said dielectric film.

According to this aspect, since the metallic film having the light transmission characteristic is placed in close contact with the micro opening, the intensity of this optical near-field increases as compared with the case of the absence of the metallic film. Namely, in order to increase the intensity of the optical near-field, it is necessary to confine the light inside the micro opening; however, according to this aspect, the metallic firm or a combination of the metallic film with the dielectric film can increase the light confining effect inside the micro opening. Therefore, by placing the metallic film in close contact with the micro opening portion, while reducing in size the micro opening of the light shielding member, it is possible to generate the optical near-field with its presence region small and with its intensity increased by the metallic film.

The above object of the present invention can be achieved by a second optical near-field generating element comprising a light shielding member, which is placed on an optical path of light emitted from a light source, for defining a micro opening having a diameter equal to or shorter than a wavelength of the light, the shielding member equipped with: a main portion for defining a basic shape of the micro opening; and a protrusion portion protruding from the main portion toward the center of the micro opening.

According to the second optical near-field generating element of the present invention, when light is emitted from the light source, an optical near-field is generated near the micro opening on the opposite side of where the light enters, because of the micro opening having the diameter equal to or shorter than the wavelength of the light, which is defined by the light shielding member placed on the optical path. In addition to this, since the protrusion portion of the light shielding member protrudes toward the center of the micro opening and the inner area of the basic shape, e.g. such as a circle or an oval or a polygon or the like, is reduced locally, the presence region of the optical near-field becomes small as compared with the case of the absence of the protrusion portion, which has been confirmed by the present inventors. It is theoretically considered that the presence of the protrusion portion as described above increases the amount of light to be confined inside the micro opening defined by the protrusion portion. Therefore, disposing the protrusion portion on the micro opening portion, while reducing in size the micro opening of the light shielding member, can generate the optical near-field with its presence region much smaller and with its intensity increased.

Incidentally, the light shielding member in the second optical near-field generating element of the present invention is constructed by a metallic film or the like, for example.

In one aspect of the second optical near-field generating element, the basic shape of the micro opening may be a polygon.

According to this aspect, the shape of the micro opening can be defined by protruding one or a plurality of protrusion portions from a side and an apex in the basic shape of a polygon such as a triangle, a tetragon, a pentagon, a hexagon, an octagon, and the like.

In another aspect of the second optical near-field generating element, the basic shape of the micro opening may be a circle or an oval.

According to this aspect, the shape of the micro opening can be defined by protruding one or a plurality of protrusion portions from a circumference in the basic shape of a circle or an oval.

In another aspect of the second optical near-field generating element, a plurality of protrusion portions may be placed at positions point-symmetrical with the center of the micro opening.

By constituting in this manner, it is possible to generate, adjacent to the micro opening, the optical near-field which is point-symmetrical with the center of the micro opening, because a plurality of protrusion portions placed at point-symmetrical positions can reduce the micro opening.

The above object of the present invention can be achieved by the combination of the first optical near-field generating element and the second optical near-field generating element. Namely, in this element, a dielectric film is placed in close contact with the micro opening, and the light shielding member has a main portion for defining a basic shape of the micro opening and a protrusion portion protruding from the main portion toward the center of the micro opening.

According to this element, the presence region of the optical near-field can be reduced by the protrusion portion, and at the same time the intensity of the optical near-field can be increased by the dielectric film.

In another aspect of the first or second optical near-field generating element, it may be further provided with a light guiding member for guiding the light emitted from the light source. Further, the light shielding member may be placed at a tip of the light guiding member in the forward direction of the light.

According to this aspect, when light is emitted from a light source, it is guided to the micro opening, which is located at the tip of the light guiding member, by the light guiding member, for example, such as an optical fiber, a solid immersion lens, and the like, and the optical near-field is generated adjacent to the micro opening. Therefore, it is possible to surely generate the optical near-field by guiding the light from the light source with the light guiding member Incidentally, in this case, the refractive index of the dielectric film is preferably higher than that of the light guiding member constituting the optical path on the light incident side of the light shielding member, which makes it possible to efficiently confine the light inside the micro opening.

In one aspect provided with a light guiding member, the light guiding member may be an optical fiber.

By constituting in this manner, it is possible to surely generate the optical near-field with its small presence region and its high intensity, at the tip of a probe array head for an optical memory, a fiber probe for a microscope, or the like.

In this case, moreover, the optical fiber may be covered with a metallic film and the light shielding member may be provided with the metallic film.

By constituting in this manner, it is possible to obtain such a configuration as generates the optical near-field at the tip of an optical fiber relatively easily.

Incidentally, it is possible to reduce the tip of the optical fiber to about 20 to 30 nm under the existing micro-fabrication technique, and if coating it with the metallic film by coating or deposition, it is possible to obtain the configuration having the micro opening for generating the optical near-field at the tip of the optical fiber as described above, relatively easily.

Alternatively, in another aspect provided with a light guiding member, the light guiding member may be provided with a solid immersion lens.

By constituting in this manner, it becomes possible to surely generate the optical near-field with its small presence region and its high intensity.

In another aspect of the first or second optical near-field generating element, it may include the light source.

According to this aspect, it is possible to establish the optical near-field generating element of a light source built-in type.

The above object of the present invention can be achieved by an optical apparatus provided with the above described optical near-field generating element (including its various aspects).

According to the optical apparatus of the present invention, since it is provided with the above described optical near-field generating element, it is possible to realize various optical apparatuses, such as an exposure head of a micro-fabrication apparatus including an exposure apparatus, a fiber probe for a microscope, an optical head of an optical memory, and the like, which efficiently generate the optical near-field with its small presence region and its high intensity. In particular, since the optical near-field is reduced down to small and generates light with superior light intensity, the utility value is practically high in the application of an optical memory requiring the speed of writing and reading, an optical communication system or an optical device requiring the speed of operating, a micro-fabrication device requiring the speed of fabrication such as a exposure speed or the like.

In one aspect of the optical apparatus of the present invention, it is provided with a plurality of the optical near-field generating elements with them arrayed.

According to this aspect, it is possible to realize an optical apparatus, such as a probe array head of an optical memory or the like, which efficiently generate the optical near-field with its small presence region and high intensity.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENT

Preferred embodiments of the present invention will be explained below with reference to the drawings.

(First Embodiment)

Figures 1, 2:
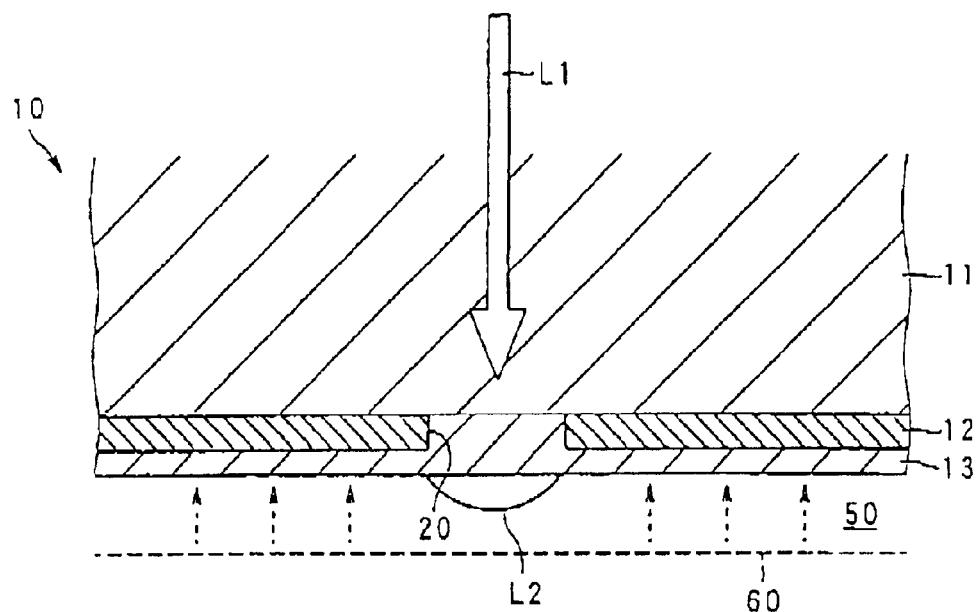
FIG. 1 is an enlarged sectional view showing a portion near a micro opening of an optical near-field generating element according to a first embodiment of the present invention.
FIG. 2 is a table showing a light transmittance and an optical amplification effect on the basis of a film thickness of a dielectric film adhered on a micro opening, which is obtained from a simulation according to the first embodiment.
Figure 3:
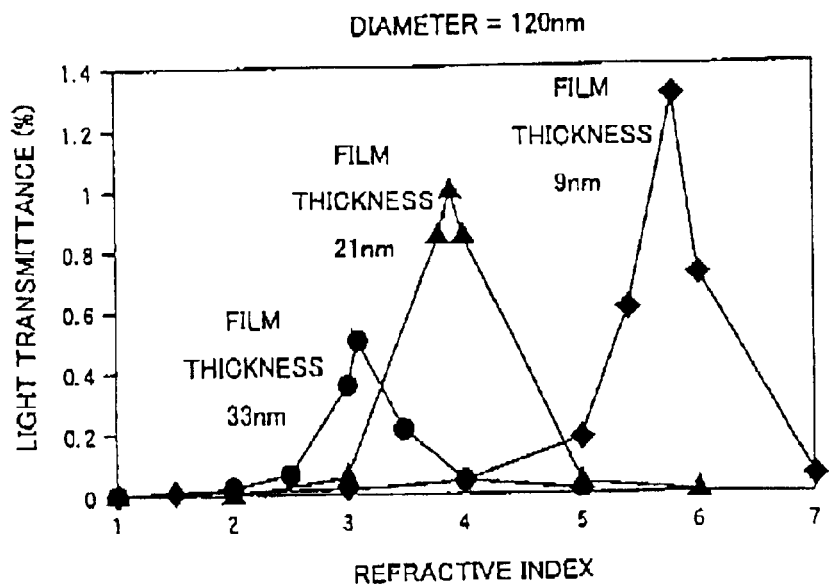
FIG. 3 is a property graph showing a relation between a refractive index and a light transmittance, with regard to various film thicknesses of a dielectric film when a diameter of the micro opening is fixed to 120 nm, which is obtained from the simulation according to the first embodiment.
Figure 4:
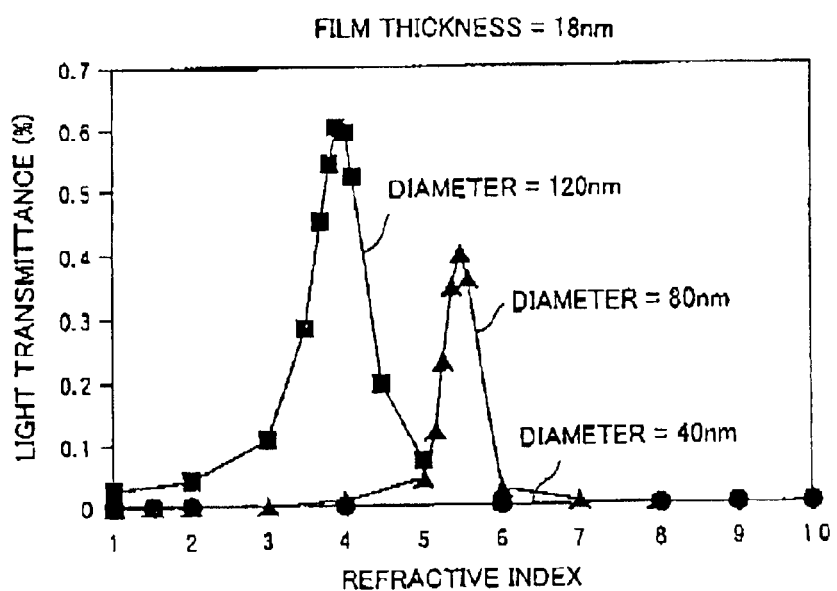
FIG. 4 is a property graph showing a relation between a refractive index and a light transmittance of a dielectric film, with regard to various diameters when a film thickness of the dielectric film is fixed to 18 nm, which is obtained from the simulation according to the first embodiment.

At first, an optical near-field generating element of a first embodiment is described with reference to FIGS. 1 to 4. FIG. 1 is an enlarged sectional view showing a portion near a micro opening of the optical near-field generating element according to the first embodiment of the present invention. FIG. 2 is a table showing a light transmittance and an optical amplification effect on the basis of a film thickness of a dielectric film adhered on the micro opening, which is obtained from a simulation. FIG. 3 is a property graph showing a relation between a refractive index and a light transmittance, with regard to various film thicknesses of the dielectric film when a diameter of the micro opening is fixed to 120 nm, which is obtained from the simulation. And, FIG. 4 is a property graph showing a relation between a refractive index and a light transmittance of a dielectric film, with regard to various diameters when a film thickness of the dielectric film is fixed to 18 nm, which is obtained from the simulation.

As shown in FIG. 1, an optical near-field generating element 10 in this embodiment is provided with; a light guiding member 11 for guiding light L1 outputted from a light source; a light shielding member 12, which is placed on an optical path of the light L1 in the light guiding member 11, for defining a micro opening 20 having a diameter equal to or shorter than a wavelength of the light L1; and a dielectric film 13 adhered on the micro opening 20.

The light guiding member 11 is composed of an optical fiber and/or a lens which are made of light transmissive material, for example, such as glass, quartz, plastic and the like.

The light shielding member 12 is made of a light shielding material in which a light transmittance is, for example, about 50% or less. Actually, it is made of a light shielding material, for example, such as metallic film, alloy film, metallic silicide, organic film and the like. The light shielding member 12 is formed so as to cover an outer surface of the light guiding member 11 (a lower surface of the light guiding member 11 in FIG. 1) by deposition, coating and the like. The film thickness is, for example, from several nm to several hundred nm. However, the material and the film thickness are not especially limited as long as the micro opening 20 can be made.

The diameter of the micro opening 20 is set to be equal to or less than the wavelength of the light L1. Thus, a spherically optical near-field L2 having a radius close to the diameter of the micro opening 20 is generated within an air 50, on the output side (a lower side in FIG. 1) of this micro opening 20. For example, a diameter of 500 nm or less is set for light in a wavelength band containing visual light having a wavelength of about 500 to 800 nm.

The dielectric film 13 is made of dielectric film, for example, such as titanium oxide, silicon oxide and the like. The dielectric film 13 is adhered on the outer surface (the lower surface of the light shielding member 12 in FIG. 1) of the light shielding member 12 containing the micro opening 20. A film thickness of the dielectric film 13 is, for example, from several nm to several hundred nm. Preferably, it is set at a film thickness equal to or less than half the wavelength of the light, so as to increase the strength of the optical near-field.

According to the optical near-field generating element 10 having the above-mentioned configuration, when the light L1 is emitted from the light source, the light L1 is guided through the light guiding member 11. The micro opening 20 made on the light shielding member 12 causes the optical near-field L2 to be generated near the micro opening 20 on the side opposite to the input side of the light. Here, as long as the optical near-field L2 is in contact with the air 50, it stays near the micro opening 20, and it has no physical influence on external field. However, under this condition, if a surface 60 of an object that can suck up the light from the optical near-field L2 (for example, a recording medium or a target sample of a microscope) approach to a portion within several ten nm to several hundred mm, with respect to the surface of the dielectric film 13, namely, if it approaches up to an existence region of a surface wave of the optical near-field L2, light is emitted from the optical near-field L2 to the surface 60. Thus, a micro region to the degree of the existence region of the optical near-field L2 can be used as a unit to emit the light. As a result, as mentioned later, a record density in an optical memory can be made higher exceeding the diffractive limit, and the resolution in a fiber probe can be made higher exceeding the diffractive limit.

Here, the improvement of the usage efficiency of the light or the improvement of a light transmittance resulting from the configuration that the dielectric film 13 is adhered on the micro opening 20 for generating the optical near-field L2 is considered by a simulation.

At first, when the mutual action between light and an object having a size equal to or smaller than a wavelength is calculated, a conventional geometrical method for targeting a world in which the size of the object is equal to or greater than the wavelength can not obtain an accurate solution. Thus, in order to grasp an accurate phenomenon, it is necessary to strictly solve a wave equation. However, unless it is a simple calculation model, the precise solution can not be obtained. Hence, a numerically analyzing method is used.

Here, the calculation is carried out by using a finite difference time domain method (FDTD Method) in which a Maxwell equation that is a basic equation for an electromagnetic phenomenon is differentiated spatially and temporally. By the way, this calculating method is detailed in, for example, K. Yee, "Numerical solution of initial boundary value problems involving Maxwell's equations in isotropic media", IEEE Trans. Antennas Propagat., vol. 14, pp302–307, 1966.

Actually, in the case that the wavelength of the light is 650 nm, the micro opening 20 has a shape of a square composed of sides of 120 nm and $MgF_2$ (magnesium fluoride) whose refractive index is n=2.8 is used as the material of the dielectric film 13, this calculation is performed on four kinds of: (1) a case that the film thickness of the dielectric film 13 is 0 (namely, a case having no dielectric film 13); (2) a case that the film thickness of the dielectric film 13 is 33 nm; (3) a case that the film thickness of the dielectric film 13 is 21 nm; and (4) a case that the film thickness of the dielectric film 13 is 9 nm.

The table of FIG. 2 shows the light transmittance in the micro opening 20 and the amplification effect in which the case having no dielectric film 13 is used as a standard (one time) that is obtained as the result of those simulation calculations.

As shown in FIG. 2, in the case of the comparison example in which the dielectric film 13 is not formed (the dielectric film 13 is removed from the configuration of FIG. 1), the light transmittance is only 0.01%. On the contrary, in the case in which the dielectric film 13 having the film thickness of 33 nm is adhered, the light transmittance is increased up to 0.3%, and the strength of the optical near-field L2 is sharply increased to 30 times that of the comparison example in which the dielectric film 13 is not formed. Also, in the case in which the dielectric film 13 having the film thickness of 21 nm is adhered, the light transmittance is increased up to 0.06%, and the strength of the optical near-field L2 is sharply increased to 6 times that of the comparison example in which the dielectric film 13 is not formed. Moreover, in the case in which the dielectric film 13 having the film thickness of 9 nm is formed, the light transmittance is increased up to 0.02%, and the strength of the optical near-field L2 is sharply increased to 2 times that of the comparison example in which the dielectric film 13 is not formed.

In this way, according to the conventional technique having no dielectric film 13, it can be said that the usage efficiency of the light is low and it is difficult to increase the strength of the optical near-field L2 to the practically usable level. In contrast with this, if the configuration in which the dielectric film 13 is adhered on the micro opening 20 such as this embodiment, it can be said that the usage efficiency of the light can be made dramatically higher to thereby increase the strength of the optical near-field L2 up to the practically usable level.

Moreover, the property graph of FIG. 3 shows the change of the light transmittance when the refractive index of the dielectric film 13 is changed, respectively, with regard to the above-mentioned three kinds of the film thicknesses (33 nm, 21 nm and 9 nm), in the simulation. Incidentally, other conditions are the same as the conditions of the above-mentioned simulation.

As shown in FIG. 3, if the film thickness is 33 nm, the light transmittance has the maximum value when the refractive index of the dielectric film 13 is about 3. If the film thickness is 21 nm, the light transmittance has the maximum value when the refractive index of the dielectric film 13 is about 4. And, if the film thickness is about 9 nm, the light transmittance has the maximum value when the refractive index of the dielectric film 13 is about 6.

Moreover, the property graph of FIG. 4 shows the change in the light transmittance when the film thickness of the dielectric film 13 is fixed to 18 nm and the refractive index of the dielectric film 13 is changed, respectively, with regard to three kinds of openings of the micro opening 20 (120 nm, 80 nm and 40 nm), in the simulation. Incidentally, other conditions are the same as the conditions of the above-mentioned first simulation.

As shown in FIG. 4, if the diameter of the micro opening 20 is 120 nm, the light transmittance has the maximum value when the refractive index of the dielectric film 13 is about 4. If the diameter is 80 nm, the light transmittance has the maximum value when the refractive index of the dielectric film 13 is about 5.5. And, if the diameter is about 40 nm, the light transmittance has the maximum value when the refractive index of the dielectric film 13 is about 8.

As mentioned above, as shown in FIGS. 2 to 4, the usage efficiency of the light can be increased to the maximum by selecting the film thickness and the refractive index of the dielectric film 13, the diameter of the micro opening 20 and the like depending on a wavelength of light and the like which are determined depending on a concrete usage or actual adaptation of the optical near-field generating element 10. By the way, when the optical near-field generating elements 10 is actually adapted to an optical device, an optical apparatus and the like, the settings of the film thickness and the refractive index of the dielectric film 13, the setting of the diameter of the micro opening 20 and the like may be done on the basis of the simulations as mentioned above, or may be done experimentally and experientially.

As mentioned above, according to the first embodiment, the dielectric film 13 is adhered on the micro opening 20. Thus, it is possible to extremely increase the strength of the optical near-field L2 while making the existence region of the optical near-field L2 smaller. In particular, the film thickness of the dielectric film 13 is thinned so as to be equal to or less than half the wavelength of the light. Hence, the usage of the dielectric film 13 having the usual refractive index enables the strength of the optical near-field L2 to be effectively increased. By the way, if the refractive index of such a dielectric film 13 is equal to or greater than that of the light guiding member 11 and equal to or greater than that of the air 50, the effect of increasing the strength of the optical near-field L2 is actualized. Preferably, the usage of the dielectric film 13 having a relatively high refractive index of 2 or more enables the strength of the optical near-field L2 to be much effectively increased.

The dielectric film 13 in this embodiment as mentioned above may be composed of a single layer film or a multiple-layer film. If it is composed of the single film, the film forming step and the structure may be simple. On the other hand, if it is composed of the multiple-layer film, it is possible to obtain a desirable refractive index or a higher refractive index that can not be obtained from the single layer film.

In addition, in this embodiment, the light guiding member 11 made of the glass and the like is placed on the light source side of the light shielding member 12 (the upper side in FIG. 1). However, as long as the optical near-field L2 is generated in the micro opening 20, air can be used as the light guiding member (Second Embodiment)

Figure 5:
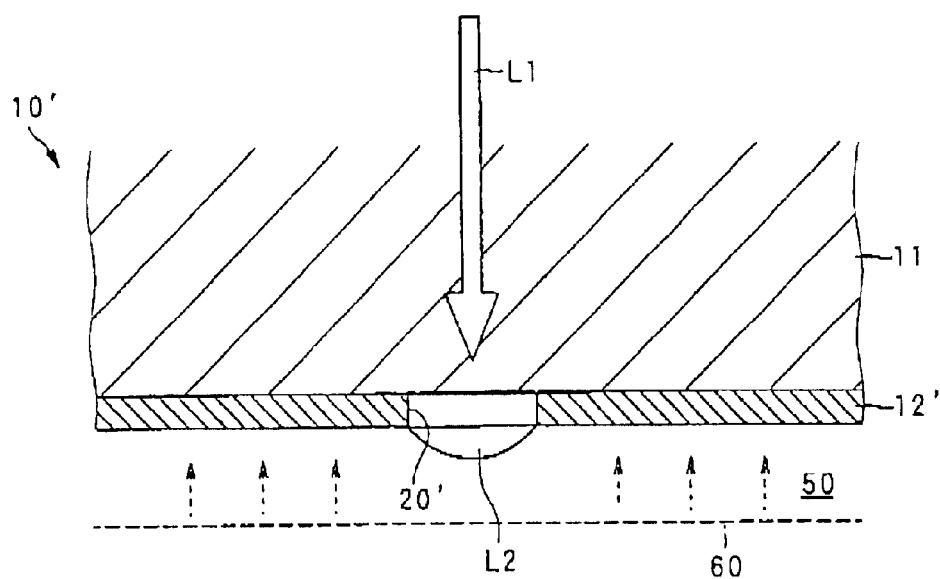
FIG. 5 is an enlarged sectional view showing a portion near a micro opening of an optical near-field generating element according to a second embodiment of the present invention.

An optical near-field generating element in a second embodiment will be described below with reference to FIGS. 5 to 8C. FIG. 5 is an enlarged sectional view showing a portion near a micro opening of the optical near-field generating element according to the second embodiment of the present invention. FIGS. 6A to 6D and FIGS. 7A to 7D are plan views of micro openings respectively showing various actual examples according to the shape of the micro opening in the second embodiment. FIGS. 8A to 8C are property graphs showing a secondary distribution of an optical strength of an optical near-field near the micro opening, which is obtained from a simulation.

As shown in FIG. 5, an optical near-field generating element 10' in this embodiment is provided with: the light guiding member 11 for guiding the light L1 outputted from the light source; and a light shielding member 12', which is placed on an optical path of the light L1 in the light guiding member 11, for defining a micro opening 20' having the diameter equal to or shorter than the wavelength of the light L1.

The light guiding member 11 is composed of the optical fiber and the lens which are made of the light transmissive material, for example, such as glass, quartz, plastic and the like.

The light shielding member 12' is made of the light shielding material in which the light transmittance is, for example, about 50% or less. Actually, it is made of the light shielding material, for example, such as metallic film, alloy film, metallic silicide, organic film and the like. The light shielding member 12' is formed so as to cover the outer surface of the light guiding member 11 (the lower surface of the light guiding member 11 in FIG. 5) by deposition, coating and the like. The film thickness is, for example, from several nm to several hundred nm. However, the material and the film thickness are not especially limited as long as the micro opening 20' can be made.

In the second embodiment, the light shielding member 12' is provided with a main portion for defining the basic shape of the micro opening 20' and a protrusion portion protruding from the main portion toward the center of the micro opening 20'.

The diameter of the micro opening 20' defined by the main portion (namely, the portion except the protrusion portion) of the light shielding member 12' is set to be equal to or less than the wavelength of the light L1. Thus, the substantially spherical optical near-field L2 having the radius close to the diameter is generated within the air 50, on the output side (a lower side in FIG. 5) of this micro opening 20'.

Figure 6A:
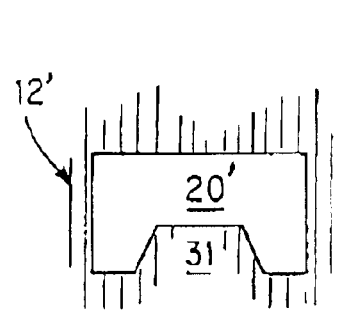
FIGS. 6A to 6D are plan views (No. 1) of micro openings showing various actual examples according to the shape of the micro opening in the second embodiment.
Figure 6B:
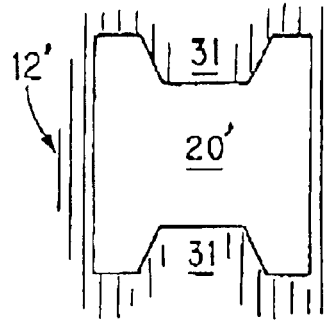
Figure 6C:
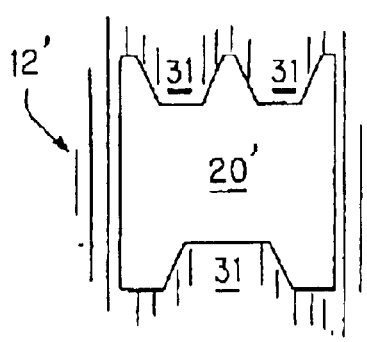
Figure 6D:
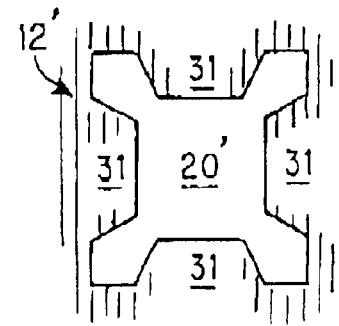

Actually, the light shielding member 12' has a main portion for defining the micro opening 20', which is square as a basic shape, and a protrusion portion 31 protruding from the main portion toward the center of the micro opening 20', respectively, as shown in FIGS. 6A to 6D. That is, FIG. 6A is an actual example in which the light shielding member 12' has one protrusion portion 31. FIG. 6B is an actual example in which the light shielding member 12' has two protrusion portions 31. FIG. 6C is an actual example in which the light shielding member 12' has three protrusion portions 31. And, FIG. 6D is an actual example in which the light shielding member 12' has four protrusion portions 31.

Figure 7A:
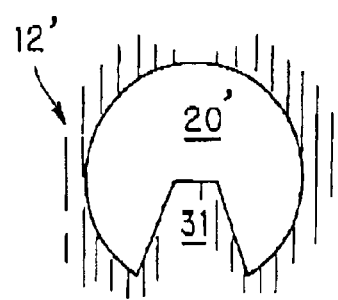
FIGS. 7A to 7D are plan views (No.2) of micro openings respectively showing various actual examples according to the shape of the micro opening in the second embodiment.
Figure 7B:
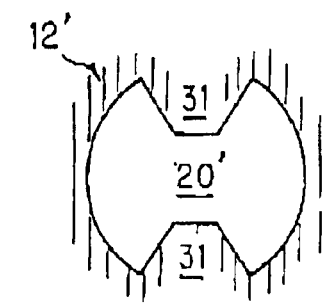
Figure 7C:
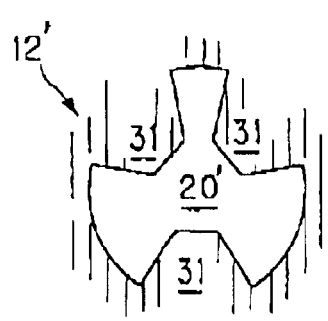
Figure 7D:
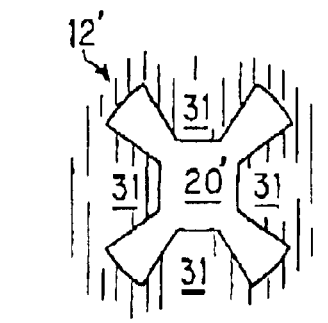
Figure 8A:
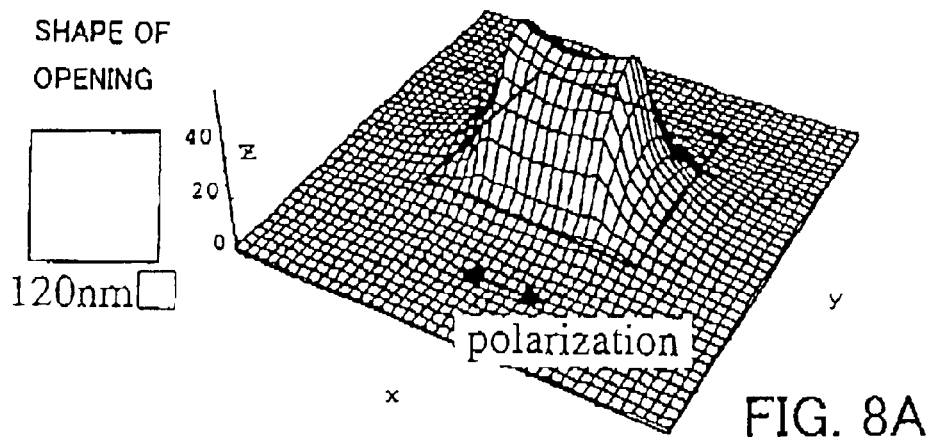
FIGS. 8A to 8C are property graphs showing an optical strength of an optical near-field near the micro opening, which is obtained from a simulation according to the second embodiment.
Figure 8B:
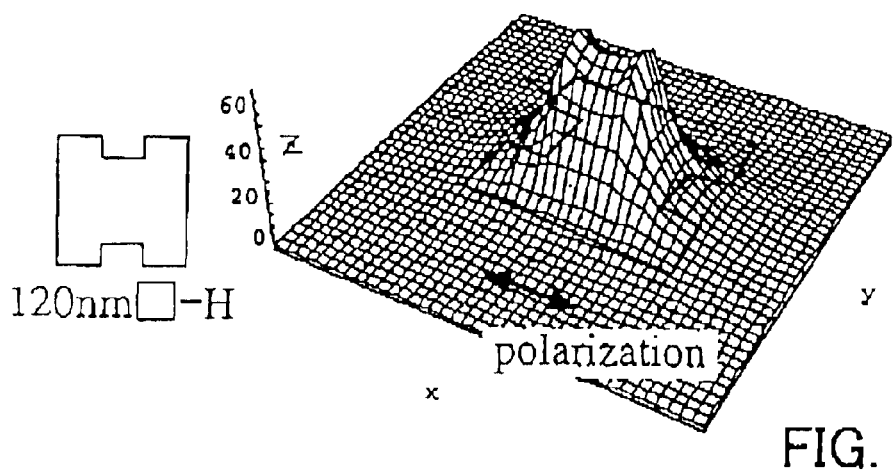
Figure 8C:
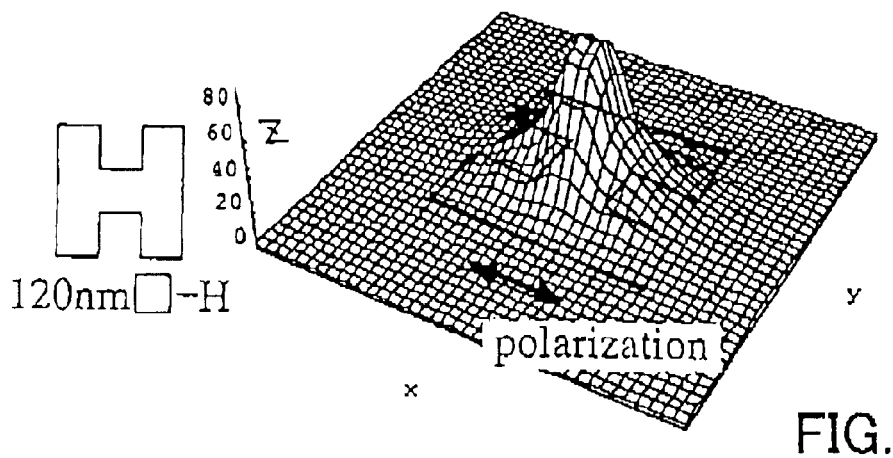

Or, the light shielding member 12' shown in FIG. 5 has a main portion for defining the micro opening 20', which is circular as a basic shape, and a protrusion portion 31 protruding from the main portion toward the center of the micro opening 20', respectively, as shown in FIGS. 7A to 7D. That is, FIG. 7A is an actual example in which the light shielding member 12' has one protrusion portion 31. FIG. 7B is an actual example in which the light shielding member 12' has two protrusion portions 31. FIG. 7C is an actual example in which the light shielding member 12' has three protrusion portions 31. And, FIG. 7D is an actual example in which the light shielding member 12' has four protrusion portions 31.

According to the optical near-field generating element 10' having the above-mentioned configuration, when the light L1 is emitted from the light source, it is guided through the light guiding member 11. The micro opening 20' made on the light shielding member 12' causes the optical near-field L2 to be generated near the micro opening 20' on the side opposite to the input side of the light. Here, as long as the optical near-field L2 is in contact with the air 50, it stays near the micro opening 20, and it has no physical influence on the external field. However, under this condition, if the surface 60 of the object that can suck up the light from the optical near-field L2 (for example, the recording medium or the target sample of the microscope) approaches to a portion within several ten nm to several hundred mm, with respect to the surface of the light shielding member 12', namely, if it approaches to the existence region of the surface wave of the optical near-field L2, the light is emitted from the optical near-field L2 to the surface 60. Thus, the micro region to the degree of the existence of the optical near-field L2 can be used as a unit to emit the light. As a result, as mentioned later, the record density in the optical memory can be made higher exceeding the diffractive limit, and the resolution in the fiber probe can be made higher exceeding the diffractive limit.

Here, the improvement of the usage efficiency of the light or the improvement of the light transmittance resulting from the special configuration that the protrusion portion 31 is used as shown in FIGS. 6A to 7D is considered by a simulation.

Also in the second embodiment, the calculation using the finite difference time domain method is carried out similarly to the above-mentioned case of the first embodiment.

Actually, under the basic condition that the wavelength of the light is 650 nm, this simulation calculation is performed on three kinds of: (1) a case that the shape of the micro opening 20' is a square having sides of 120 nm as shown on the left side of FIG. 8A; (2) a case that its basic shape is a square having sides of 120 nm and two protrusion portions are protruding by 20 nm in the upper and lower directions at the center as shown on the left side f FIG. 8B; and (3) a case that its basic shape is a square having sides of 120 nm and two protrusion portions are protruding by 40 nm in the upper and lower directions at the center as shown in FIG. 8C.

FIGS. 8A to 8C show the optical strengths of the optical near-fields in respective points (x, y) including the micro opening, which are obtained as the results of those simulation calculations, respectively. By the way, FIGS. 8A to 8C show the optical strengths of the optical near-fields in the respective points (x, y) within the planes including the micro opening, respectively, on the z-axis. Also, the scales indicative of the respective coordinates of x, y and z are relative. However, the scale settings based on the same unit are performed on the z-axis between FIGS. 8A to 8C.

As can be understood from the comparison between FIGS. 8A, 8B and 8C, the existence of the protrusion portion enables the existence region of the optical near-field to be smaller, and also enables the optical strength of the optical near-field to be higher. Moreover, as can be understood from the comparison between FIGS. 8B and 8C, the greater the degree of the protrusion, the smaller the existence region of the optical near-field, and the higher the optical strength of the optical near-field.

As mentioned above, as shown in FIGS. 5 to 8C, the existence region of the optical near-field L2 can be made smaller and the optical strength can be made higher by selecting the shape of the micro opening 20' depending on a wavelength of light and the like which are determined depending on a concrete usage or actual adaptation of the optical near-field generating element 10'. By the way, when the optical near-field generating elements 10' is actually adapted to an optical device, an optical apparatus and the like, the shape of the micro opening 20' and the like may be determined on the basis of the simulations as mentioned above, or may be done experimentally and experientially.

As mentioned above, according to the second embodiment, the existence region of the optical near-field L2 can be made smaller, and at the same time, the usage efficiency of the light can be made higher, by forming the protrusion portion 31 on the micro opening 20' (refer to FIGS. 6A to 7D), as compared with the conventional technique in which the shape of the micro opening is simple square, circular or the like.

By the way, in the second embodiment, the basic shape of the micro opening 20' is not limited to the square or the circle as shown in FIGS. 6A to 7D. It may be a polygon, such as a triangle, a pentagon, a hexagon, an octagon or the like, or an ellipse. Even in any case, the above-mentioned effects of making the existence region of the optical near-field smaller and further making its optical strength higher can be obtained more or less by protruding one or a plurality of protrusion portions from a side or a vertex of the basic shape.

Also, a plurality of such protrusion portions may be formed at positions point-symmetrical with the center of the micro opening 20'. Accordingly, it is possible to generate the optical near-field L2 point-symmetrical with the center of the micro opening 20' near the micro opening 20'.

In addition, in this embodiment, the light guiding member 11 made of glass and the like is placed on the light source side of the light shielding member 12' (the upper side of FIG. 5). However, air can be used as the light guiding member as long as the optical near-field L2 is generated in the micro opening 20'.

(Third Embodiment)

An optical near-field generating element in a third embodiment will be described below with reference to FIG. 1 and FIGS. 6A to 7D.

The optical near-field generating element in the third embodiment is designed such that the shape of the micro opening 20 in the configuration of the first embodiment shown in FIG. 1 is replaced with the micro opening 20' whose shape is modified by using the protrusion portion 31, such as the second embodiment shown in FIGS. 6A to 7D. The other configurations of the optical near-field generating element in the third embodiment are similar to those of the first embodiment.

Thus, according to the third embodiment, the protrusion portion formed on the light shielding member for defining the micro opening enables the existence region of the optical near-field to be made smaller, and also enables the optical strength to be made higher. At the same time, the dielectric film adhered on the micro opening enables the optical strength to be made much higher.

(Variation)

The variations of the respective embodiments as mentioned above will be described below with reference to FIGS. 9A to 10E. Here, FIGS. 9A to 9D and FIGS. 10A to 10E are enlarged sectional views respectively showing the portions near the optical near-field generating element, similarly to FIG. 1.

FIGS. 9A to 9D show the variations in the first or third embodiment in which the dielectric film is formed on the micro opening, respectively. The film thickness of the dielectric film and the region or the position on which the dielectric film is formed are modified from those of the first or third embodiment.

Figure 9A:
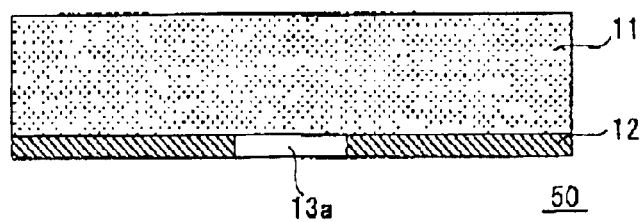
FIGS. 9A to 9D are enlarged sectional views showing a portion near a micro opening of an optical near-field generating element according to various variations of the present invention.

That is, in the variation of FIG. 9A, a dielectric film 13a is formed only within the micro opening, and the film thickness thereof is equal to that of the light shielding member 12.

Figure 9B:
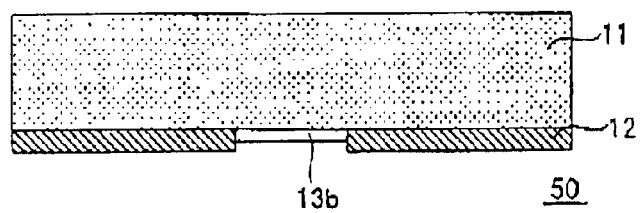

In the variation of FIG. 9B, a dielectric film 13b is formed only within the micro opening, and the film thickness thereof is thinner than that of the light shielding member 12.

Figure 9C:
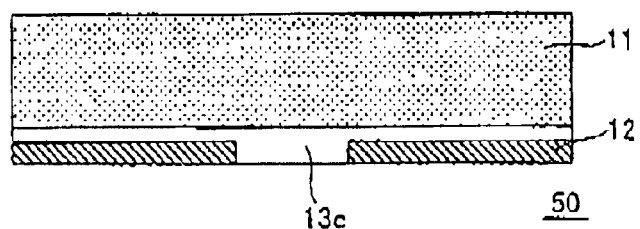

In the variation of FIG. 9C, a dielectric film 13c is formed within the micro opening and on the optical input side of the light shielding member 12.

Figure 9D:
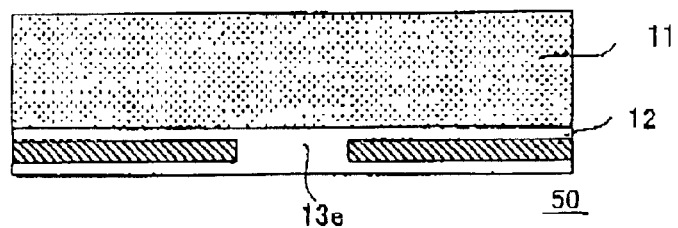

In the variation of FIG. 9D, a dielectric film 13e is formed within the micro opening and on both the optical input side and the optical output side of the light shielding member 12.

Even in the respective variations of FIGS. 9A to 9D as mentioned above, the dielectric film is adhered on the micro opening. Thus, the optical near-field can be made stronger.

Figure 10A:
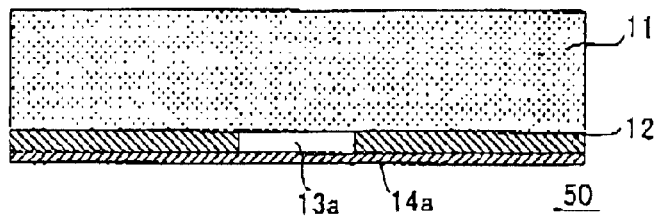
FIGS. 10A to 10E are enlarged sectional views showing the portion near a micro opening of the optical near-field generating element according to the various variations of the present invention.
Figure 10B:
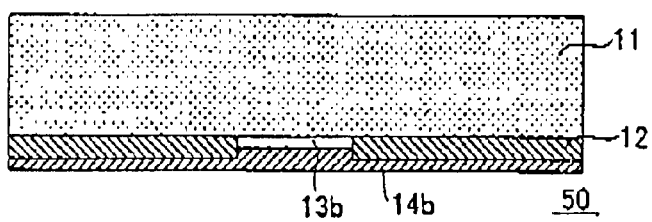
Figure 10C:
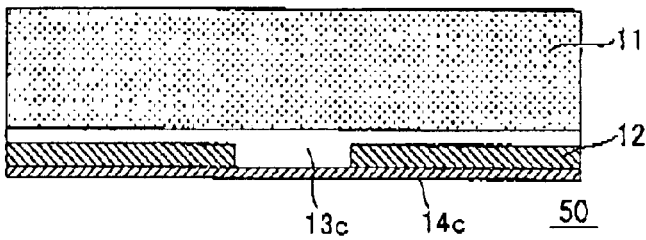
Figure 10D:
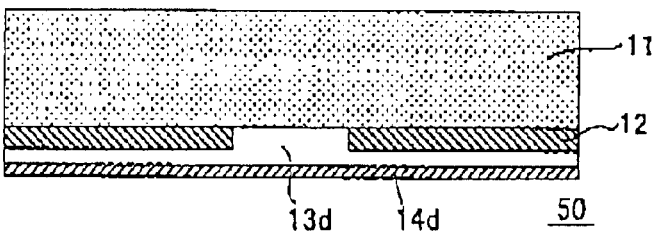
Figure 10E:
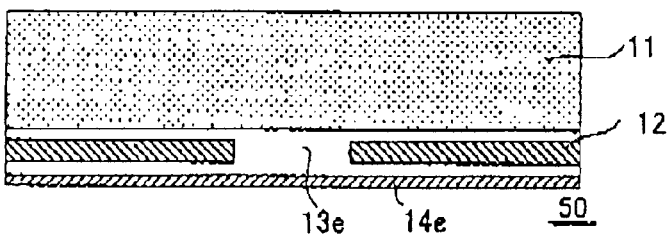

FIGS. 10A to 10E show the variations of the first or third embodiments in which the dielectric film is formed on the micro opening, respectively. The variations of FIGS. 10A to 10C are modified from the variations of FIGS. 9A to 9C so that a metallic film is formed on the optical output side in the dielectric film. The variation of FIG. 10D is modified from the first embodiment so that the metallic film is formed on the optical output side in the dielectric film. And, the variation of FIG. 10E is modified from the variation of FIG. 9D so that the metallic film is formed on the optical output side in the dielectric film.

That is, in the variation of FIG. 10A, the dielectric film 13a is formed only within the micro opening, and the film thickness thereof is equal to that of the light shielding member 12, and a metallic film 14a is further formed on the optical output side thereof.

In the variation of FIG. 10B, the dielectric film 13b is formed only within the micro opening, and the film thickness thereof is thinner than that of the light shielding member 12, and a metallic film 14b is further formed on the optical output side thereof.

In the variation of FIG. 10C, the dielectric film 13c is formed within the micro opening and on the optical input side of the light shielding member 12, and a metallic film 14c is further formed on the optical output side thereof.

In the variation of FIG. 10D, the dielectric film 13d is formed within the micro opening and on the optical output side of the light shielding member 12, and a metallic film 14d is further formed on the optical output side thereof.

In the variation of FIG. 10E, the dielectric film 13e is formed within the micro opening and on both the optical input side and the optical output side of the light shielding member 12, and a metallic film 14e is further formed on the optical output side thereof.

Even in each of the above-mentioned variations of FIGS. 10A to 10E, the dielectric film is adhered on the micro opening, and the metallic film is further formed. Thus, the optical near-field can be made stronger.

Moreover, in the variations of FIGS. 10A to 10E, the metallic film is formed on the optical output side of the dielectric film. However, such metallic film may be formed on the optical input side of the dielectric film in the first or third embodiment. Moreover, it may be formed on both the optical input side and the optical output side of the dielectric film.

As mentioned above, under the condition that the dielectric film made of the substance different from the medium on the optical input side of the light shielding member 12 and different from the medium on the optical output side of the light shielding member 12 is formed on the portion near the micro opening, the various variations can be made to the first or third embodiment. In particular, when a refractive index of the dielectric film is assumed to be n(d), a refractive index of the medium on the optical input side of the light shielding film is assumed to be n(in) and a refractive index of the medium on the optical output side of the light shielding film is assumed to be n(out), the various implements that can effectively make the optical near-field stronger can be established by satisfying the equations of:

$$n(d) \geq n(in), \text{ and } n(d) \geq n(out).$$

In addition, as the above-mentioned variation of the second embodiment, the metallic films as shown in FIGS. 10A to 10E may be formed on the optical output side or the optical input side.

(Fourth Embodiment)

Figure 11:
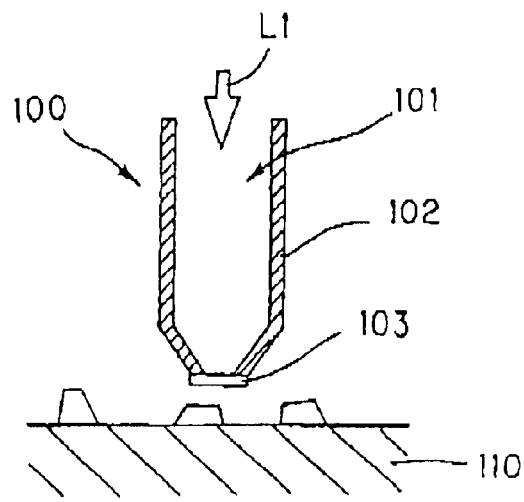
FIG. 11 is an enlarged sectional view showing a portion in which an optical near-field of a fiber probe according to a fourth embodiment is generated.

A fiber probe as an example of an optical apparatus according to a fourth embodiment of the present invention will be described below with reference to FIG. 11. FIG. 11 is an enlarged sectional view showing a portion in which an optical near-field of the fiber probe is generated.

As shown in FIG. 11, a fiber probe 100 for an optical microscope has an optical fiber 101 serving as the light guiding member. The optical fiber 101 is coated with a metallic film 102 constituting the example of the light shielding member. Then, a dielectric film 103 similar to that of the first embodiment is adhered on the micro opening made on the metallic film 102 at a tip of the optical fiber 101.

By the way, the conventional fine machining technique enables the tip of the optical fiber 101 to be fine at about 20 to 30 nm. If the metallic film 102 is covered by coating or deposition, the configuration having the micro opening for the generation of the optical near-field can be relatively easily formed at the tip of the optical fiber 101. Then, the dielectric film 103 having a predetermined film thickness can be adhered on the tip.

Thus, according to the fourth embodiment, when closely placing the fiber probe 100 above a surface of a target object 110 at an interval of a distance of, for example, about several ten nm, a mark or an image at a high resolution exceeding the diffraction limit can be produced on the surface of the target object 110 by the optical near-field which depends on the incident light L1 and has the small existence region. Moreover, the mark or the image can be produced in a relatively short time by the optical near-field which depends on the incident light L1 and has the high optical strength.

By the way, also in the fourth embodiment, the protrusion portion (refer to FIGS. 6A to 7D) may be formed on the metallic film 102 at the location for defining the micro opening, instead of or in addition to the formation of the dielectric film 103, similarly to the second or third embodiment.

In addition, the fiber probe 100 in the fourth embodiment may be established as a built-in light source type of a fiber probe containing a light source.

(Fifth Embodiment)

Figure 12:
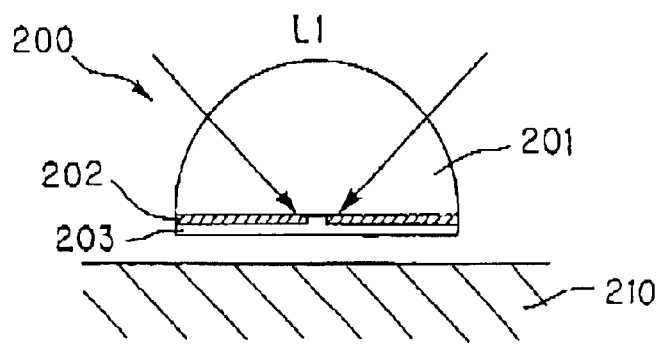
FIG. 12 is an enlarged sectional view showing a portion in which an optical near-field of an optical head according to a fifth embodiment is generated.

An optical head as an example of an optical apparatus according to a fifth embodiment of the present invention will be described below with reference to FIG. 12. FIG. 12 is an enlarged sectional view showing a portion in which an optical near-field of the optical head is generated.

As shown in FIG. 12, an optical head 200 for an optical memory, which records data on an optically recording medium, such as an optical disc or the like, at a high density and reads out the data from the optical disc or the like, includes a solid immersion lens 201 as the light guiding member. A mask 202 constituting an example of the light shielding member is placed on a flat surface of the solid immersion lens 201. A dielectric film 203 similar to that of the first embodiment is adhered on the micro opening made on the mask 202 on the center of the flat surface of the solid immersion lens 201.

Thus, according to the fifth embodiment, when closely placing the optical head 200 above a surface of a recording medium 210 at an interval of a distance of, for example, about several ten nm, the optical recording at a high density exceeding the diffraction limit can be attained by the optical near-field which depends on the incident light L1 and has the small existence region. Moreover, the recording or the reproduction at a writing speed or a reading out speed which can be used on practical usage can be attained through the optical near-field that depends on the incident light L1 and has the high optical strength.

By the way, also in the fifth embodiment, the protrusion portion (refer to FIGS. 6A to 7D) may be formed on the mask 202 at the location for defining the micro opening, instead of or in addition to the formation of the dielectric film 203, similarly to the second or third embodiment.

In addition, the optical head 200 in the fifth embodiment may be established as a built-in light source type of an optical head containing a light source.

(Sixth Embodiment)

Figure 13:
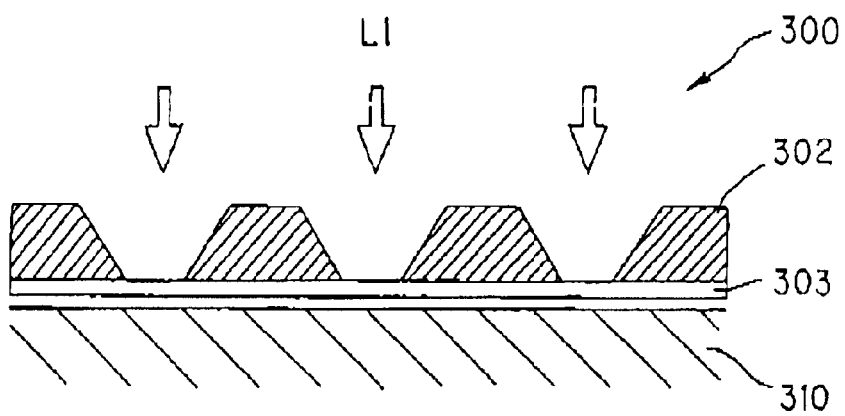
FIG. 13 is an enlarged sectional view showing a portion in which an optical near-field of a probe array head according to a sixth embodiment is generated.

A probe array head as an example of an optical apparatus according to a sixth embodiment of the present invention will be described below with reference to FIG. 13. FIG. 13 is an enlarged sectional view showing a portion in which an optical near-field of the probe array head is generated.

As shown in FIG. 13, a probe array head 300 for recording data on an optically recording medium, such as an optical disc or the like, at a high density and reading out the data from the optical disc or the like, includes light shielding member(s) 302 for defining a plurality of arrayed micro openings. A dielectric film 303 similar to that of the first embodiment is adhered on those micro openings.

Thus, according to the sixth embodiment, when closely placing the probe array head 300 above a surface of a recording medium 310 at an interval of a distance of, for example, about several ten nm, the optical recording at the high density exceeding the diffraction limit can be attained by the optical near-field which depends on the incident light L1 and has the small existence region. Moreover, the recording or the reproduction at the writing speed or the reading out speed which can be used on practical usage can be attained through the optical near-field that depends on the incident light L1 and has the high optical strength.

By the way, also in the sixth embodiment, the protrusion portion (refer to FIGS. 6A to 7D) may be formed on the probe array head 300 at the location for defining the micro opening, instead of or in addition to the formation of the dielectric film 303, similarly to the second or third embodiment.

In addition, the probe array head 300 in the sixth embodiment may be established as a built-in light source type of a probe array head containing a light source.

By the way, besides the optical apparatuses according to the fourth to sixth embodiments, it can be applied to, for example, an optically fine machining apparatus, such as an exposing apparatus instead of a laser machining apparatus and the like, and various optical apparatuses, such as a device for an optical switch or an optical device for an optical communication system of an optical modulator, a light source and the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-236110 filed on Aug. 3, 2001 including the specification, claims, drawings and summary is incorporated herein by reference in its entirety.

What is claimed is:

1. An optical near-field generating element comprising:

a light shielding member, which is placed on an optical path of light emitted from a light source, for defining a micro opening having a diameter equal to or shorter than a wavelength of the light; and a dielectric film placed in close contact with the micro opening, wherein at least a portion of said dielectric film is disposed within the micro opening.

2. An optical near-field generating element according to claim 1, wherein the micro opening has the diameter equal to or shorter than ½ of the wavelength of the light.

3. An optical near-field generating element according to claim 1, wherein a refractive index of said dielectric film is greater than that of an incident side of the optical path.

4. An optical near-field generating element according to claim 1, wherein said dielectric film comprises a single layer.

5. An optical near-field generating element according to claim 1, wherein said dielectric film comprises a plurality of layers.

6. An optical near-field generating element according to claim 1, comprising a metallic film having a light transmission characteristic wherein said metallic film is formed on an optical output side of said dielectric film.

7. An optical near-field generating element according to claim 1, wherein said light shielding member has a main portion for defining a basic shape of the micro opening and a protrusion portion protruding from the main portion toward the center of the micro opening.

8. An optical near-field generating element according to claim 7, wherein the basic shape of the micro opening is a polygon.

9. An optical near-field generating element according to claim 7, wherein the basic shape of the micro opening is a circle or an oval.

10. An optical near-field generating element according to claim 7, wherein a plurality of protrusion portions are placed at positions point-symmetrical with the center of the micro opening.

11. An optical near-field generating element according to claim 1, further comprising a light guiding member for guiding the light emitted from the light source, said light shielding member being placed at a tip of said light guiding member in the forward direction of the light.

12. An optical near-field generating element according to claim 11, wherein said light guiding member is an optical fiber.

13. An optical near-field generating element according to claim 12, wherein the optical fiber is covered with a metallic film and said light shielding member comprises the metallic film.

14. An optical near-field generating element according to claim 11, wherein said light guiding member comprises a solid immersion lens.

15. An optical near-field generating element according to claim 1, including the light source.

16. The element according to claim 1, further comprising:

a metallic film, wherein at least a portion of the metallic film is disposed within the micro opening.

17. The element according to claim 16, wherein at least a second portion of the metallic film is disposed outside the micro opening.

18. The element according to claim 17, wherein the second portion of the metallic film is disposed on an optical output side of the light shielding member.

19. The element according to claim 1, further comprising a metallic film, which is disposed on an optical output side of the light shielding member.

20. The element according to claim 1, wherein a second portion of the dielectric layer is disposed outside the micro opening.

21. The element according to claim 20, wherein the second portion of the dielectric layer is disposed on an optical output side of the light shielding member.

22. The element according to claim 21, further comprising a metallic layer, which is disposed on an optical output side of the second portion of the dielectric layer.

23. The element according to claim 20, wherein the second portion of the dielectric layer is disposed on an optical input side of the light shielding member.

24. The element according to claim 23, wherein a third portion of the dielectric layer is disposed outside the micro opening and is disposed on an optical output side of the light shielding member.

25. The element according to claim 24, further comprising a metallic layer, which is disposed on an optical output side of the third portion of the dielectric layer.

26. The element according to claim 23, further comprising a metallic layer, which is disposed on an optical output side of the light shielding member.

27. An optical apparatus comprising an optical near-field generating element, said optical near-field generating element comprising:

a light shielding member, which is placed on an optical path of light emitted from a light source, for defining a micro opening having a diameter equal to or shorter than a wavelength of the light; and a dielectric film placed in close contact with the micro opening, wherein at least a portion of said dielectric film is disposed within the micro opening.

28. An optical apparatus according to claim 27, comprising a plurality of said optical near-field generating elements with them arrayed.

29. An optical near-field generating element, comprising:

a light guiding member for guiding light;

a light shielding member, which defines a micro opening having a width less than or equal to a wavelength of the light, wherein the light guiding member guides light to the light shielding member, a dielectric film disposed adjacent to the micro opening, wherein a refractive index of the dielectric film is greater than a refractive index of the light guiding member.

30. The element according to claim 29, wherein the refractive index of the dielectric film is greater than a refractive index of a medium on an optical output side of the light shielding layer.

* * * * *